(12) United States Patent
Mehl

(10) Patent No.: US 9,958,669 B2
(45) Date of Patent: May 1, 2018

(54) METHOD FOR OPERATING AN ILLUMINATING DEVICE

(71) Applicant: OSRAM GmbH, Munich (DE)

(72) Inventor: Oliver Mehl, Berlin (DE)

(73) Assignee: OSRAM GMBH, Munich (DE)

( * ) Notice: Subject to any disclaimer, the term of this patent is extended or adjusted under 35 U.S.C. 154(b) by 0 days. days.

(21) Appl. No.: 15/308,850

(22) PCT Filed: Apr. 29, 2015

(86) PCT No.: PCT/EP2015/059353
§ 371 (c)(1),
(2) Date: Nov. 4, 2016

(87) PCT Pub. No.: WO2015/169666
PCT Pub. Date: Nov. 12, 2015

(65) Prior Publication Data
US 2017/0068089 A1    Mar. 9, 2017

(30) Foreign Application Priority Data

May 6, 2014    (DE) .................. 10 2014 208 416

(51) Int. Cl.
*G02B 21/00*    (2006.01)
*G02B 26/00*    (2006.01)
(Continued)

(52) U.S. Cl.
CPC ......... *G02B 26/008* (2013.01); *G03B 21/204* (2013.01); *G03B 33/08* (2013.01); *H05B 37/0281* (2013.01)

(58) Field of Classification Search
CPC ..... G02B 26/008; G03B 21/204; G03B 33/08
See application file for complete search history.

(56) References Cited

U.S. PATENT DOCUMENTS

| 2007/0019408 A1* | 1/2007 | McGuire, Jr. ......... F21S 10/007 362/231 |
| 2011/0116253 A1* | 5/2011 | Sugiyama ............. F21S 10/007 362/84 |

(Continued)

FOREIGN PATENT DOCUMENTS

| CN | 102650813 A | 8/2012 |
| CN | 103186021 A | 7/2013 |

(Continued)

OTHER PUBLICATIONS

German Search Report based on application No. 10 2014 208 416.4 (8 pages) dated May 6, 2015 (for reference purpose only).

(Continued)

*Primary Examiner* — Thomas M Sember
(74) *Attorney, Agent, or Firm* — Viering, Jentschura & Partner mbB

(57) ABSTRACT

Various embodiments may relate to a method for operating an illuminating device with a pump radiation source for emitting pump radiation, and a phosphor wheel, on which a first phosphor for emitting first conversion light and a second phosphor for emitting second conversion light are provided, in which method the phosphor wheel rotates about a rotation axis and in the process is irradiated with the pump radiation in an irradiation region eccentrically with respect to the rotation axis in such a way that a circular track is irradiated owing to the rotation of the phosphor wheel, wherein during a 360° revolution of the phosphor wheel the first phosphor is irradiated with a first pump radiation power and the second phosphor is irradiated with a second pump radiation power, which is different than the first pump radiation power.

11 Claims, 2 Drawing Sheets

(51) Int. Cl.
    *G03B 21/20*     (2006.01)
    *G03B 33/08*     (2006.01)
    *H05B 37/02*     (2006.01)

(56)            References Cited

U.S. PATENT DOCUMENTS

2013/0163224 A1   6/2013   Chang
2014/0022760 A1   1/2014   Hartwig
2014/0029237 A1   1/2014   Mehl
2014/0369025 A1   12/2014  Mehl
2015/0167907 A1   6/2015   Hoehmann
2015/0204492 A1   7/2015   Bichler et al.
2015/0293436 A1   10/2015  Drumm

FOREIGN PATENT DOCUMENTS

CN      103453447 A        12/2013
DE      102012201192 A1    8/2013
DE      102012209426 A1    12/2013
DE      102012211837 A1    1/2014
DE      102012213467 A1    2/2014
WO      2013120522 A1      8/2013

OTHER PUBLICATIONS

International Search Report based on application No. PCT/EP2015/059353 (4 pages + 2 pages English translation) dated Jul. 7, 2015 (for reference purpose).
Chinese Office Action based on application No. 2015-80023859.7 (5 pages), dated Nov. 15, 2017.

\* cited by examiner

| | 2a/R | 3a/G | 5a/B | 4a/Y | 2b/R | 3b/G | 5b/B | 4b/Y |
|---|---|---|---|---|---|---|---|---|
| CIEx | 0,614 | 0,337 | 0,152 | 0,427 | 0,658 | 0,265 | 0,152 | 0,427 |
| CIEy | 0,386 | 0,598 | 0,022 | 0,553 | 0,341 | 0,654 | 0,022 | 0,553 |
| ∢ | 40° | 57° | 28° | 55° | 55° | 57° | 28° | 40° |
| P | 25% | 25% | 53% | 100% | 100% | 100% | 100% | 100% |

METHOD FOR OPERATING AN ILLUMINATING DEVICE

RELATED APPLICATIONS

The present application is a national stage entry according to 35 U.S.C. § 371 of PCT application No.: PCT/EP2015/059353 filed on Apr. 29, 2015, which claims priority from German application No.: 10 2014 208 416.4 filed on May 6, 2014, and is incorporated herein by reference in its entirety.

TECHNICAL FIELD

Various embodiments relate to a method for operating an illuminating device having a pump radiation source and a phosphor wheel.

BACKGROUND

Light sources having a high luminance can find application in the field of endoscopy or in projection apparatus, for example, gas discharge lamps still being the most widely used at the present time. Recent developments concern the combination of a radiation source having a high radiance, for instance a laser, with a phosphor element which converts the pump radiation emitted thereby and which is arranged at a distance from the pump radiation source. The phosphor element converts the for example ultraviolet or blue pump radiation and emits conversion light having a longer wavelength.

In particular, a phosphor wheel can also be provided as the phosphor element, said phosphor wheel rotating about a rotation axis and being irradiated with pump radiation on a circular track in the process. In this case, it is also possible to arrange different phosphors on the phosphor wheel successively in the circumferential direction, such that the colors of the conversion light then sequentially jointly span an RGB color gamut, for example. The term "color gamut" denotes the area jointly spanned by the colors, specifically the color loci thereof, in a color space.

The present disclosure addresses the technical problem of specifying a particularly advantageous method for operating an illuminating device with phosphor wheel, and a correspondingly configured illuminating device.

SUMMARY

According to various embodiments, this problem is solved by a method for operating an illuminating device including
a pump radiation source for emitting pump radiation, and
a phosphor wheel, on which a first phosphor for emitting first conversion light and a second phosphor for emitting second conversion light are provided,
wherein the first phosphor and the second phosphor are arranged in a manner spatially separated from one another on the phosphor wheel,
and wherein a first useful light based on the first conversion light and a second useful light based on the second conversion light have the same color, but a different color locus in the CIE standard colorimetric system,
in which method the phosphor wheel rotates about a rotation axis and in the process is irradiated with the pump radiation in an irradiation region eccentrically with respect to the rotation axis in such a way that a circular track is irradiated owing to the rotation of the phosphor wheel, wherein during a 360° revolution of the phosphor wheel the first phosphor is irradiated with a first pump radiation power and the second phosphor is irradiated with a second pump radiation power, which is different than the first pump radiation power;
and
an illuminating device having a control unit for controlling the pump radiation source, which control unit is configured for a corresponding method.

The illuminating device is thus firstly provided such that the first and second useful light do not differ in color, that is to say for example with respect to one another are not like R(ed) and G(reen) or G and B(lue) (or R and B), but rather have the same color, but have different color loci. By means of the method according to various embodiments, then, the underlying phosphors, that is to say the first phosphor underlying the first useful light and the second phosphor underlying the second useful light, are irradiated with a different pump radiation power.

The first and second pump radiation powers can differ for example insofar as the greater pump radiation power can be greater than the lesser pump radiation power by, with increasing preference in this order, at least 25%, 50%, 75%, 100%, 125%, 150%, 175% or 200%; inasmuch as the pump radiation power changes per phosphor during a rotation, "pump radiation power" refers to an average value respectively formed over the corresponding circumferential portion (of the first or second phosphor).

The two phosphors are thus irradiated differently during a revolution, wherein an effective color (perceived by a user, for example) having an effective color locus in the CIE standard colorimetric system (CIE 1931, in the entire disclosure) results, when averaged over the revolution.

Re the "different color locus": in the CIE standard colorimetric system, the first useful light has a first color locus and the second useful light has a second color locus, which two color loci are not identical; the two color loci are found in the green; they can be spaced apart from one another in terms of absolute value by, for example, at least 0.02, 0.03, 0.04 or 0.05 (the geometrical spacing is considered); possible upper limits are for instance at most 0.20 or at most 0.15.

If the two color loci are found in the red, they can for example lie approximately on the spectrum locus, that is to say be spaced apart therefrom for instance, by less than 0.07, 0.05, 0.03 or 0.01 (once again in the CIE standard colorimetric system), and the first and second useful light can differ in the respective dominant wavelength thereof by for example at least 5 nm, preferably at least 10 nm, with further preference at least 15 nm.

With the proportionally different irradiation, it is then possible to shift, that is to say set, the effective color locus "between" the first color locus and the second color locus. The color (of the first and second useful light) for example with two further colors, which generally can also be made available by one/a plurality of further illuminating device(s), can span an RGB color gamut. The area thereof and thus the size of the addressable color gamut can be set by the method according to various embodiments.

In the case of many phosphors there is a relationship such that although some afford advantages with regard to their color locus (for instance span a greater color gamut), they have a low conversion efficiency, for example. Moreover, a saturation behavior is then observed in many cases at elevated luminous flux, and the conversion efficiency decreases further (the phosphors are less efficient at elevated temperature). Efficient phosphors, on the other hand, are often disadvantageous with regard to their color locus.

Specifically, for illustration: the color gamut addressable with the second color locus may be greater, for example. If this is then advantageous in an application, for instance for reproducing image contents using a projection apparatus, the first phosphor underlying the first useful light is irradiated to a correspondingly lesser extent than the second phosphor, such that the effective color locus is shifted toward the second color locus, that is to say that the color gamut is correspondingly large. If the first phosphor is then irradiated proportionally more in a different operating mode, the luminous flux increases, but the addressable color gamut is smaller because the effective color locus slides nearer to the first color locus. Finally, in an operating mode "maximum luminous flux" the two phosphors can also be irradiated with the same pump radiation power over a further multiplicity of successive revolutions, as a result of which precisely the maximum luminous flux can be attained.

In the case of the operating mode "large color gamut" the first phosphor could theoretically also no longer be irradiated at all, such that the first pump radiation power would be equal to zero. Even if the effective color locus would then lie at the second color locus (of the second color with a "large color gamut"), the inventor has observed disadvantages insofar as, in the case of a pump radiation power varying repeatedly between 0% and 100%, the 100% value would have to become relatively large in order to obtain a desired average luminous flux. A pump radiation source with correspondingly large dimensioning would have to be kept available for this purpose, that is to say a relatively large technical outlay for a resultant low average pump radiation. Against this background, a not completely optimized effective color locus is accepted in order to be able to realize an illuminating device that is efficient overall including with regard to the manufacturing costs.

The first and the second useful light have "the same color"; if the color is "green", the dominant wavelength of the first and second useful light can be for example at least 520 nm, preferably at least 530 nm, with further preference at least 535 nm and (independently of the lower limits) e.g. at most 570 nm, preferably at most 565 nm, with further preference at most 560 nm. If the color is "red", the dominant wavelength of the first and second useful light can be for example at least 590 nm, preferably at least 595 nm.

The term "phosphor wheel" generally is not intended to imply that it must necessarily have a circular-disk-shaped or annular geometry; generally a rotating body is involved which is irradiated on a circular path owing to the rotation. The arrangement can thus for example also be a cone that rotates about its axis of symmetry, wherein the direction of incidence can then be perpendicular to the rotation axis and the conversion light can be emitted parallel to the rotation axis, or vice-versa.

Furthermore, it is also possible e.g. to arrange the phosphors on a lateral surface of a cylinder, preferably a lateral surface of a circular cylinder, that is to say for instance on the lateral surface of a roll. Preferably, however, the phosphor wheel is a planar body designed for a rotation about a rotation axis extending transversely with respect to the surface (in which the phosphors are arranged), preferably perpendicularly thereto.

A respective "phosphor" can also be a phosphor mixture, that is to say a mixture of a plurality of conversion materials; preferably, however, exactly one respective conversion material is provided for a respective phosphor. On the phosphor wheel, in general, alongside the irradiation region mentioned, there can also be a further irradiation region or further irradiation regions, that is to say that one or further circular track(s) can also be irradiated (e.g. for a different channel); however, exactly one irradiation region is preferred.

The phosphor wheel is constructed for example from a substrate different than the phosphor, for instance made from metal or a glass, to which the phosphors are applied, for instance by dispensing, wringing, blade coating, spreading or spraying of a phosphor suspension. On account of the suitability for rotation, the substrate is preferably nevertheless annular/circular-disk-shaped and a rotation shaft is connected to the substrate; the rotation shaft can also be connected to an annular substrate or pass through the latter.

Such a substrate is usually embodied in a flat fashion, that is to say has a greater extent in a surface direction than perpendicularly thereto, for instance greater by at least 2-, 5-, 10-, 20-fold (relative to the average of the shortest and longest extents in the case of a non-circular geometry); the same applies to the phosphor layer provided on the substrate, such that the phosphor wheel overall is planar (apart from, for example, securing means for a rotation shaft or the like). The phosphor wheel can be operated in transmission and/or in reflection.

During a 360° revolution the first phosphor is irradiated with a first pump radiation power and the second phosphor is irradiated with a second pump radiation power, which is different than said first pump radiation power. This variation between first pump radiation power and second pump radiation power is preferably repeated over a first multiplicity of successive 360° revolutions, for instance over—with increasing preference in this order—at least 50, 250, 500, 750 or 1000 successive revolutions. Preferably, over the first multiplicity of revolutions the first and/or the second pump radiation power are in each case identical per se from revolution to revolution, that is to say that the first and second pump radiation powers per revolution differ from one another, but the first pump radiation power in a subsequent revolution is always identical to the first pump radiation power in the preceding revolution, and this analogously applies to the second pump radiation power as well.

In a preferred configuration, the first multiplicity of successive revolutions, that is to say the operating mode "large color gamut", is followed by a second multiplicity of successive revolutions during which the first and second phosphors are irradiated with the same pump radiation power in an operating mode "maximum luminous flux".

The first/second (hereinafter "respective") useful light "is based" on the respective conversion light. This means that the respective useful light either is identical to the respective conversion light or is provided by filtering the respective conversion light. In other words, the respective useful light is thus intended to correspond to the respective conversion light in at least one spectral sub-range (which is not filtered out), but it can also correspond thereto over the entire spectral range, that is to say that the respective conversion light can also be used without filtering. The term "useful light" here is not intended to imply that this light is then necessarily intended to be fed to an application without further modification, rather this is precisely the light emitted by the illuminating device, downstream of which in a projection apparatus, for example, further optical components can also be provided.

With regard to an effective relationship, the ratio of respective phosphor, respective conversion light and respective useful light can be concretized to the effect that if the respective phosphor is not irradiated and the respective conversion light is thus not emitted, the respective useful light is not available either (irrespective of whether the latter is the respective conversion light itself or a non-filtered portion thereof); the respective useful light and the respective conversion light are directly proportional to one another.

Preferably, at least one of the first and second useful light is filtered respective conversion light. "Filtering" in this respect means that the luminous flux in a spectral range which can extend for example over at least 50 nm or at least 100 nm is in any case reduced, for instance by at least 50% or 75% (in each case on average), but is preferably equal to zero. A so-called cut-off filter may be particularly preferred, which transmits the light below a limiting wavelength and blocks it above said limiting wavelength (for example by reflection), or vice-versa. The filter can for example be provided on the phosphor wheel itself, for instance applied to the respective phosphor, or for example also be arranged on a dedicated filter wheel or generally be provided downstream of the phosphor wheel (at a distance therefrom).

In one preferred development, the first phosphor and the second phosphor are the same phosphor, that is to say that the first conversion light and the second conversion light have identical spectral properties, and the different color is then set solely by the filtering. In this case, only a single one of the first and second useful light can then be filtered light, which may be preferred, for example, if "the same color" is green.

Thus for example the unfiltered green phosphor as first phosphor may be more efficient, but may have a poorer color locus (the light of the first phosphor); by contrast, in the case of the second phosphor, the light of the green phosphor can be filtered and the second color can thus be adapted toward a better color locus. However, the luminous efficiency becomes poorer as a result of the filtering.

Furthermore, in the case of the same first and second phosphors, both the first and the second useful light can also be in each case filtered respective conversion light. If the color thus lies in the red, for example, a yellow phosphor, for example, can be provided as first and second phosphors, and the originally yellow conversion light of said yellow phosphor, filtered differently, then produces the red first useful light and the red second useful light.

The dependence on luminous efficiency/color locus has already been discussed. One preferred embodiment generally concerns first useful light provided with a first luminous efficiency and second useful light provided with a second luminous efficiency, wherein the first luminous efficiency is greater than the second luminous efficiency by, with increasing preference in this order, at least 20%, 30%, 40%, 50%, 60%, 70% or 80%.

The different luminous efficiency can be caused for example by different filtering, for instance if the first useful light is not filtered at all or is filtered at least to a lesser extent than the second useful light. On the other hand, the luminous efficiency can also be different on account of the respective phosphors themselves (that is to say if the first and second phosphors are not the same phosphor) because phosphors can differ precisely not just in their spectral properties but also in efficiency. In the context of this disclosure, "luminous efficiency" refers to the luminous flux of the respective useful light per pump radiation power incident on the respective phosphor, that is to say to lumens per watt.

Reference has already been made above to the dominant wavelength of a respective useful light, which results as the point of intersection between a half-line proceeding from the white point and passing through the respective color locus and the spectrum locus. The first useful light then has a first dominant wavelength, and the second useful light a second dominant wavelength.

If, on the one hand, "the same color" is then preferably red, the second dominant wavelength is preferably greater than the first dominant wavelength, for instance by at least 5 nm, preferably at least 10 nm, with further preference at least 15 nm; possible upper limits can be for example at most 30 nm, 25 nm or 20 nm. If, on the other hand, "the same color" in a preferred configuration is green, the second dominant wavelength is preferably less than the first dominant wavelength, for instance by at least 5 nm, preferably at least 10 nm, with further preference at least 15 nm; possible upper limits can be for example at most 70 nm, 50 nm, 30 nm or 20 nm.

A lesser dominant wavelength in the green or a greater dominant wavelength in the red typically correlates with a greater color gamut (which is referred to as a "better color locus"), but at the same time the luminous efficiency is lower, either owing to a phosphor having a lower efficiency or on account of filter losses.

It has already been discussed in the introduction that the respective color locus of the first and second useful light in a preferred configuration together with a third and fourth color span an RGB color gamut. In this case, then, the first color locus with the third and fourth color loci span an RGB color gamut and the second color locus jointly with the third and fourth color loci do the same, wherein these two RGB color gamuts differ in their area in the CIE standard colorimetric system by at least 5%, preferably at least 10%, with further preference at least 15%. Possible upper limits can be for instance 50% or 30%. Thus the RGB color gamut with the second color of the "better color locus" would then have a correspondingly larger area (on account of the greater distance between the second color locus and the white point).

The third and/or fourth useful light can generally also be made available separately with respect to the phosphor wheel by means of (a) dedicated light source(s), for instance by means of (a) LED light source(s). Furthermore, it is also possible to provide a plurality of phosphor wheels.

Preferably, however, the phosphor wheel underlying the third and fourth useful light is the same as the phosphor wheel underlying the first and second useful light, that is to say that a third and/or fourth phosphor are/is also provided thereon. The third and/or fourth useful light are/is then "based" on the third and fourth phosphor in the sense described above, that is to say can be the respective conversion light directly or filtered. On the other hand, the third or fourth useful light can also be pump radiation used in a manner free of conversion, that is to say blue pump light (see below in detail).

Even though an RGB color gamut has been mentioned hitherto in the context of the color gamut, it can, of course, also be supplemented by yet another color, for instance by yellow and/or white. To put it another way, therefore, a fifth useful light of a fifth color (or a further useful light of a further color) can also be provided—the correspondingly fifth or further color locus can then lie either within the RGB triangle or outside the latter.

In the first-mentioned case, the corresponding useful light can then serve for example for increasing the luminous flux, whereas in the last-mentioned case the color gamut is increased, indeed is for example a quadrilateral (or else generally a higher-order polygon). Therefore, on the one hand, all indications made concerning an RGB color gamut are intended expressly also to be applicable to an RGBY color gamut, RGBYW color gamut or generally higher-order RGB color gamut; on the other hand, an RGB color gamut may also be preferred, of course, which is constructed exclusively from the three channels RGB.

In the case of an RGB color gamut, it may generally be preferred that although the blue channel is passed via the phosphor wheel, this does not involve conversion light, but rather the pump radiation itself, that is to say blue pump light. The blue pump light then impinges on the phosphor wheel, wherein a transmission window, for example, may then be provided in a portion which is intended to make the blue channel available, such that the pump light penetrates through the phosphor wheel. The window may be for example a transparent portion of the substrate, or a corresponding region may also simply be cut out. On the other hand, it is also possible to reflect and/or to scatter the pump light in the region of the blue channel, that is to say to provide for instance a reflective coating or a scatterer having high reflectance.

One preferred embodiment relates to a phosphor wheel on which not only a first first and first second phosphor, but also a second first and second second phosphor are provided. In this case, one phosphor pair including first and second phosphor is provided for green (first and second) useful light and the second phosphor pair is provided for red (first and second) useful light.

During operation, it is then also possible, for example, for either one phosphor pair or the other phosphor pair to be irradiated with power that differs during a revolution in the manner according to various embodiments. In other words, it is thus possible to set the effective color locus in the red or the effective color locus in the green.

It is preferred, however, for both the green first and the green second phosphor to be irradiated with a different pump radiation power during a revolution, and the red first and the red second phosphor as well (during the same revolution). In other words, in the case of two phosphor pairs each including first and second phosphor, namely a "green" and a "red" phosphor pair, preferably each phosphor pair is operated in the manner according to various embodiments; in this respect, all indications made above generally concerning "first and second phosphor, conversion light, useful light, etc." are intended expressly also to be disclosed for a phosphor wheel having two phosphor pairs which are operated correspondingly in each case.

As already mentioned in the introduction, various embodiments also relates to an illuminating device including pump radiation source, phosphor wheel and control unit, wherein the latter is provided for controlling the pump radiation source and is configured for a method according to various embodiments. Even if the method according to various embodiments, that is to say specifically the pump radiation power changing during the revolution, could generally also be implemented by optical means, that is to say for example by filtering or (partial) reflection of the pump radiation from the irradiation path, the pump radiation power incident on the respective phosphor is preferably set by way of a variation of the output power of the pump radiation source itself. The implementation can thus be simplified because no complex optical components are necessary; on the other hand, for reasons of energy efficiency it is also advantageous if the pump radiation source makes available only the output power that is also actually required in each case.

The pump radiation emitted by the pump radiation source impinges—in the irradiation region—on the phosphor wheel, and the different segments thereof, that is to say at least first and second phosphor, are rotated during the rotation of the phosphor wheel through the irradiation region. Expressed in a rotation angle (relating to the rotation about the rotation axis), the irradiation region can extend for example over not more than 30°, preferably not more than 20°, with further preference not more than 10°.

The phosphor wheel can generally rotate for example at 3600 revolutions per minute (rpm), 7200 rpm, 10 800 rpm or 14 400 rpm.

In general, a respective (first or second) average pump radiation power can also be achieved by means of a pulsed pump radiation, that is to say by pulse width modulation. An amplitude modulation is preferred, however; generally, in this case irradiation need not necessarily be effected over the entire respective segment, rather the segment per se can for example also be irradiated only in portions (after all the average is crucial). Preferably, however, the pump radiation is radiated over the segment of the respective phosphor (if said segment is thus moved through the irradiation region) with constant pump radiation power, precisely apart from possibly a fall or rise at the beginning or end of the respective segment.

Generally, during a 360° revolution, the wavelength of the pump radiation can also be changed in a segment-related manner (from the first phosphor to the second phosphor), for instance by an array of LASER diodes being provided as the pump radiation source, which diodes differ in their wavelength and are indeed switched on and off in a specific manner. An array of LASER diodes may generally be preferred as the pump radiation source. Preferably, the wavelength of the pump radiation remains constant during the 360° revolution, however, and solely the pump radiation power is altered.

Preferably, by means of the control unit, therefore, the amplitude of the pump radiation is altered in a clocked manner with the phosphor wheel in such a way that a respective pump radiation power is present precisely for a respective phosphor. Generally, the control unit and the phosphor wheel can be synchronized for example by means of a zero transmitter that indicates the passing of a specific position to the control unit with each revolution of the phosphor wheel.

As already mentioned in the introduction, the entire disclosure is intended expressly also to be applicable to a corresponding illuminating device, wherein precisely either the control unit is configured for a corresponding control of the pump radiation source, that is to say is not only suitable but also correspondingly configured, for example provided or supplied with a corresponding data set which can contain, for example, pump radiation patterns for different effective color loci (of the useful light).

However, the other components of the illuminating device may furthermore also be configured for a method described in the present case, that is to say, for example, the phosphor wheel may be configured precisely correspondingly, that is to say be equipped for example with a third and/or fourth phosphor.

Finally, various embodiments additionally relate to the use of a corresponding illuminating device as a light source of a projection apparatus or endoscope and/or for room lighting purposes or to put it generally for industrial and/or medical applications.

In the case of the projection apparatus, for example, the image quality thereof can also be adapted in a user-defined manner or in a situation-governed manner by a variation of the ratio of first and second pump radiation power. "In a situation-governed manner" in this respect may mean that depending on the ambient brightness the effective color locus is shifted for example closer to the first color locus and the luminous efficiency is thus increased if the ambient brightness is high, that is to say for example under daylight conditions.

With otherwise low ambient brightness, for instance in a darkened room, by contrast, the effective color locus can be shifted closer to the second color locus with the greater color gamut. "In a situation-governed manner" can additionally or alternatively also relate to the reproduced contents, such that, for instance, the high luminous flux can be chosen for text contents and the high color saturation can be chosen for image contents.

Generally, a use of the illuminating device as a light source of a projection apparatus is preferred, to be precise particularly preferably of a projection apparatus having a DLP (Digital Light Processing), LCoS (Liquid Crystal on Silicon) or LCD (Liquid Crystal Display) image generator.

In a projection apparatus, the illuminating device according to various embodiments can also be provided for 3D reproduction, for example, that is to say that it can reproduce two color spaces, for example, which are then filtered selectively relative to the eyes by means of corresponding spectacles.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figures 1, 2:
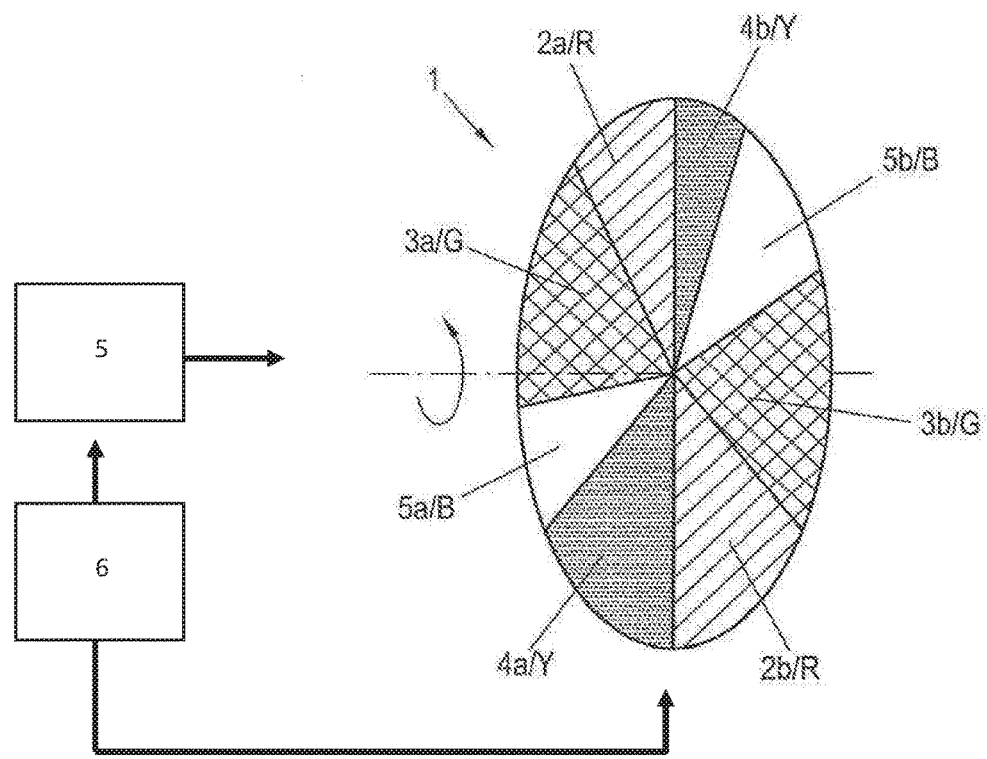
FIG. 1 shows a phosphor wheel of an illuminating device according to various embodiments in a schematic oblique view.
FIG. 2 shows a tabular overview of the pump radiation power incident on the phosphor wheel in accordance with FIG. 1 during a 360° revolution.

FIG. 1 schematically illustrates the construction of a phosphor wheel 1 of an illuminating device according to various embodiments. A red first phosphor 2a and a red second phosphor 2b are arranged on the phosphor wheel 1, which phosphors make available red first useful light and red second useful light. The respective color loci are explained further in detail with reference to FIG. 3 and are presented in tabular form in FIG. 2.

To begin with in summary, the red second useful light with the other colors span a greater color gamut than the red first useful light with the same other colors. On the other hand, however, the red first useful light can be made available with a higher luminous efficiency, that is to say that a higher luminous flux results for the same pump radiation power. The luminous efficiency of the red first useful light is greater than that of the red second useful light by almost a factor of 2.

The reason for this is that in the case of the red second useful light a spectrally larger range is filtered out in order to shift the color locus further into the red. However, filtering in principle is carried out in both cases, that is to say that the respective useful light is not identical to the conversion light emitted by the respective phosphor. In the case of the red first and second phosphor, the underlying phosphor is the same, namely a yellow phosphor. The respective color locus is then ultimately set by means of the filtering.

This is possible for example with the following set-up: the phosphor wheel 1 is operated in reflection, that is to say that blue pump light is incident from one side (in the irradiation region) and the conversion light is emitted at the same side. Corresponding filters are then precisely arranged downstream of the phosphor wheel relative to the propagation path of the conversion light, specifically on a filter wheel (not illustrated) that is coordinated with the phosphor wheel with regard to its segmentation and rotation (speed and phase).

The filters disposed downstream of the phosphor wheel 1 can be in each case multilayer systems, wherein the transmission properties can be set by way of the dielectric properties of the layer sequence and the layer thicknesses. Furthermore, the filter wheel also has transmission windows through which, given corresponding segments, the conversion light or reflected pump light (see below) passes without interaction.

The yellow phosphor underlying the red first and second useful light is an yttrium aluminum garnet doped with cerium.

Furthermore, a green first phosphor 3a and a green second phosphor 3b are arranged on the phosphor wheel 1, specifically for the emission of green first and green second useful light. The green second useful light has a better color locus, namely spans a greater color gamut; however, the green first useful light can be provided with a higher luminous efficiency; the latter is approximately 15% higher.

The green first useful light is unfiltered conversion light emitted by the green first phosphor 3a, namely the conversion light of a green phosphor. In this case, a cerium-doped lutetium aluminum garnet is provided as the green phosphor. The green second phosphor 3b is the same green phosphor, although the green second useful light is provided by filtering the green second conversion light. This results in the better color locus, on the one hand, but precisely also the reduced luminous efficiency, on the other hand.

Furthermore, two yellow 4a,b and two blue segments 5a,b are provided on the phosphor wheel 1, wherein the abovementioned yellow phosphor is arranged in said yellow segments, the conversion light of said yellow phosphor in this case not being filtered. The yellow useful light of both segments is identical.

For the two blue channels 5a,b, the phosphor wheel 1 is provided with two reflection segments; the blue pump light is thus reflected by the phosphor wheel 1 in a manner free of conversion and is then used as blue useful light in the application.

In this case, a laser having a wavelength of 452 nm is provided as the pump radiation source 5 having a control unit 6. Alternatively, however, a blue phosphor can also be provided for the blue channel and can be excited for example with UV radiation or violet radiation at 405 nm; the blue conversion light would then have for example a wavelength of 460 nm.

In the counterclockwise direction, beginning at 12 o'clock, the sequence RGBY is thus arranged twice on the phosphor wheel 1, wherein yellow (Y) and blue (B) are identical in the two sequences, but red (R) and green (G) are indeed different.

FIG. 2 illustrates with the aid of a table how the phosphor wheel is illuminated in a first operating mode. Specifically, the red first phosphor 2a and the green first phosphor 3a are operated with a lower pump radiation power (P) than the red second phosphor 2b and the green second phosphor 3b. At the beginning of the 360° revolution, the pump radiation power is at 25%, and, after the green first phosphor 3a has passed the irradiation region, said pump radiation power is then raised, specifically firstly to around 53% in the blue segment 5a and then to 100% for the rest of the revolution. As a result, therefore, the red first phosphor 2a and green first phosphor 3a are illuminated in each case with only 25% of the maximum power, but the red second phosphor 2b and green second phosphor 3b are illuminated in each case with 100%. A correspondingly varying illumination is repeated here over a multiplicity of successive revolutions.

Moreover, the table indicates for each of the segments of the phosphor wheel 1 the color locus of the respective useful light, that is to say coordinates in the CIE standard colorimetric system. The first row corresponds to the X-value, and the second row corresponds to the Y-value. Furthermore, the third row indicates the rotation angle over which the respective segment extends.

Figure 3:
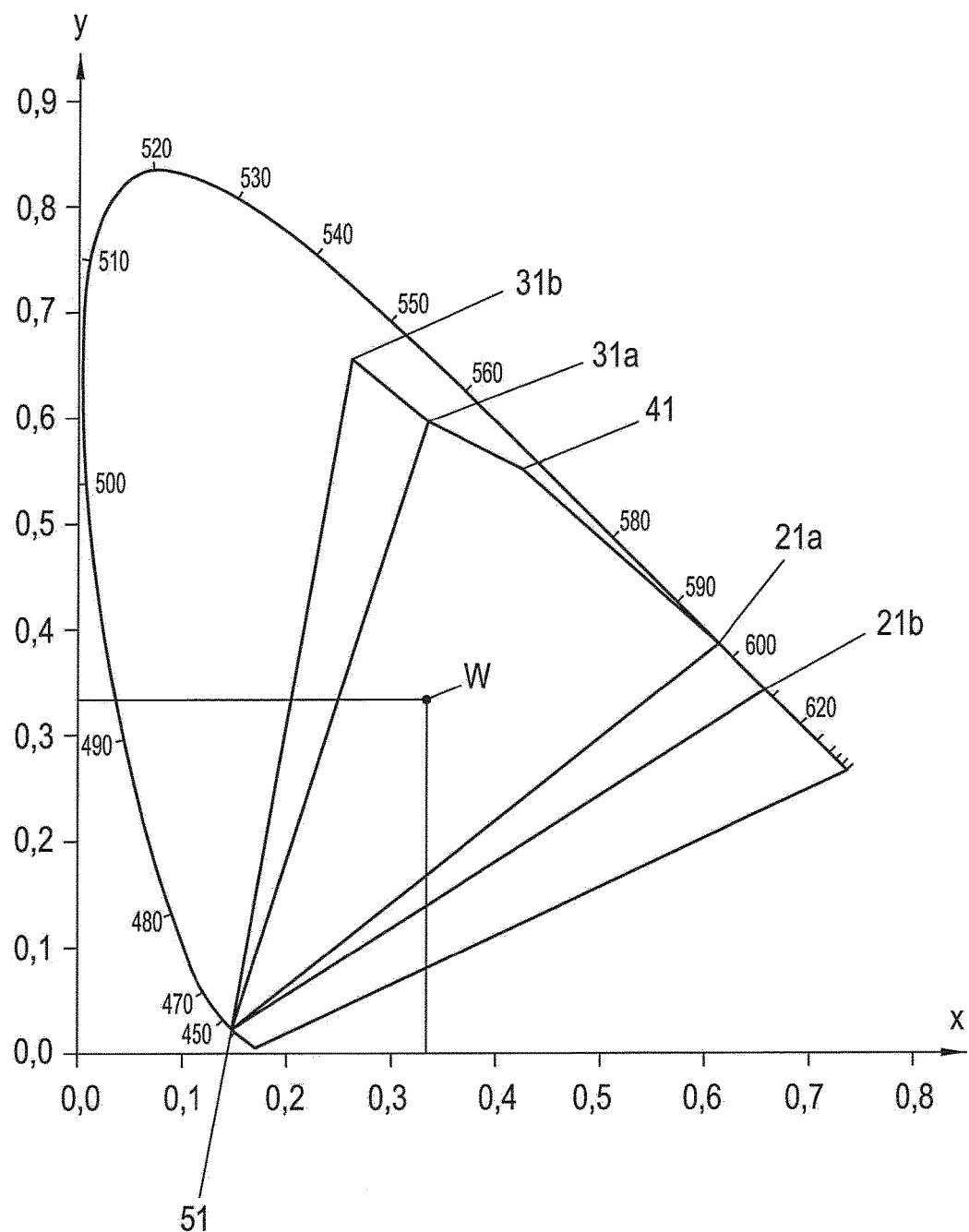
FIG. 3 shows a CIE standard colorimetric system for illustrating the different color gamuts accessible with a phosphor wheel in accordance with FIG. 1.

FIG. 3 illustrates the color loci just mentioned in a CIE standard colorimetric system. The green first color locus 31a and second color locus 31b both lie in the green. The second green useful light has a better color locus than the first green useful light, that is to say that the second green color locus 31b together with the other color loci (RBY) span a greater quadrilateral than the first green color locus 31a.

In the operating mode explained with reference to FIG. 2, the green first phosphor 3a is pumped in relation to a lesser extent, such that an effective green color locus (resulting from the averaging over the 360° revolution) lies near the green second color locus 31b. The operating mode is thus suitable and designed for good color rendering. One preferred application example is the reproduction of image contents by means of a projection apparatus.

However, since the green first phosphor 3a is illuminated precisely only proportionally, the luminous flux (of the useful light) is lower, on the other hand. Therefore, if on the other hand the projection apparatus is intended to be used to reproduce text contents and/or contents with high ambient brightness, for instance under daylight conditions, it is possible to switch to a second operating mode, in which all the segments are illuminated with 100% pump radiation power.

As a result, the effective green color locus is shifted closer toward the green first color locus 31a, whereby the area of the spanned quadrilateral thus becomes smaller.

This analogously applies to the red first color locus 21a and the red second color locus 21b. In the operating mode listed in FIG. 2, the effective red color locus resulting from averaging is shifted closer toward the red second color locus 21b. On the other hand, if the first red phosphor 2a is also operated with a pump radiation power of 100%, the effective red color locus is shifted closer toward the red first color locus 21a. Thus the color gamut is smaller, but the luminous flux is greater.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A method for operating an illuminating device comprising
a pump radiation source for emitting pump radiation, and
a phosphor wheel, on which a first phosphor for emitting first conversion light and a second phosphor for emitting second conversion light are provided,
wherein the first phosphor and the second phosphor are arranged in a manner spatially separated from one another on the phosphor wheel,
and wherein a first useful light based on the first conversion light and a second useful light based on the second conversion light have the same color, but a different color locus in the CIE standard colorimetric system,
in which method the phosphor wheel rotates about a rotation axis and in the process is irradiated with the pump radiation in an irradiation region eccentrically with respect to the rotation axis in such a way that a circular track is irradiated owing to the rotation of the phosphor wheel,
wherein during a 360° revolution of the phosphor wheel the first phosphor is irradiated with a first pump radiation power and the second phosphor is irradiated with a second pump radiation power, which is different than the first pump radiation power.

2. The method as claimed in claim 1, wherein this variation between the first pump radiation power and the second pump radiation power is repeated over a first multiplicity of successive 360° revolutions and the first phosphor and the second phosphor are irradiated with the same pump radiation power during a second multiplicity of successive 360° revolutions of the phosphor wheel that follow the first multiplicity of 360° revolutions.

3. The method as claimed in claim 1, wherein the first useful light is provided by filtering the first conversion light and/or the second useful light is provided by filtering the second conversion light.

4. The method as claimed in claim 3, wherein the first phosphor and the second phosphor are the same phosphor and the different color locus is set solely by the filtering.

5. The method as claimed in claim 1, wherein the first useful light is provided with a first luminous efficiency and the second useful light is provided with a second luminous efficiency, wherein the first luminous efficiency is at least 20% greater than the second luminous efficiency.

6. The method as claimed in claim 1, wherein the same color is red or green.

7. The method as claimed in claim 6, wherein the first useful light has a first dominant wavelength and the second useful light has a second dominant wavelength, wherein in the case of red the second dominant wavelength is greater than the first dominant wavelength and in the case of green the second dominant wavelength is less than the first dominant wavelength.

8. The method as claimed in claim 1, wherein the first useful light has a first color locus and the second useful light has a second color locus, wherein at least a third useful light having a third color locus and a fourth useful light having a fourth color locus are additionally provided, which third and fourth color loci together with respectively the first or the second color locus span at least one three-color RGB color gamut, wherein the two color gamuts differ by at least 5% in their area in the CIE standard colorimetric system.

9. The method as claimed in claim 1, wherein the color of the first and of the second useful light is green, that is to say that this useful light is based on a green first phosphor and a green second phosphor, wherein furthermore red first useful light and red second useful light is provided, which differs in the color locus but has the same color green, for which purpose a red first phosphor and a red second phosphor are additionally arranged in a manner spatially separated from one another on the phosphor wheel.

10. The method as claimed in claim 9, wherein during a 360° revolution of the phosphor wheel the green first phosphor is irradiated with a green first pump radiation power and the green second phosphor is irradiated with a green second pump radiation power, which is different than the green first pump radiation power, and during the same 360° revolution the red first phosphor is irradiated with a red first pump radiation power and the red second phosphor is irradiated with a red second pump radiation power, which is different than the green first pump radiation power, wherein this variation between the pump radiation powers is furthermore repeated over the first multiplicity of successive 360° revolutions.

11. An illuminating device comprising
a pump radiation source for emitting pump radiation,
a phosphor wheel, on which a first phosphor for emitting first conversion light and a second phosphor for emitting second conversion light are provided, and
a control unit for controlling the pump radiation source,
wherein the first and the second phosphor are arranged in a manner spatially separated from one another on the phosphor wheel,
and wherein a first useful light based on the first conversion light and a second useful light based on the second conversion light have the same color, but a different color locus in the CIE standard colorimetric system,
and wherein the control unit is furthermore configured for a method in which the phosphor wheel rotates about a rotation axis and in the process is irradiated with the pump radiation in an irradiation region eccentrically with respect to the rotation axis in such a way that a circular track is irradiated owing to the rotation of the phosphor wheel,
wherein during a 360° revolution of the phosphor wheel the first phosphor is irradiated with a first pump radiation power and the second phosphor is irradiated with a second pump radiation power, which is different than the first pump radiation power.

* * * * *